(12) United States Patent
Yasuda et al.

(10) Patent No.: US 8,080,494 B2
(45) Date of Patent: Dec. 20, 2011

(54) CATALYST, EXHAUST GAS PURIFYING CATALYST, AND METHOD OF PRODUCING THE CATALYST

(75) Inventors: Hirofumi Yasuda, Yokosuka (JP); Katsuo Suga, Yokohama (JP); Makoto Aoyama, Yokohama (JP); Toshiharu Miyamura, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 571 days.

(21) Appl. No.: 11/721,184

(22) PCT Filed: Dec. 5, 2005

(86) PCT No.: PCT/JP2005/022285
§ 371 (c)(1),
(2), (4) Date: Jun. 8, 2007

(87) PCT Pub. No.: WO2006/064684
PCT Pub. Date: Jun. 22, 2006

(65) Prior Publication Data
US 2009/0239739 A1     Sep. 24, 2009

(30) Foreign Application Priority Data
Dec. 14, 2004   (JP) .................. 2004-361616

(51) Int. Cl.
*B01J 23/00*    (2006.01)
*B01J 21/00*    (2006.01)
*B01J 20/00*    (2006.01)

(52) U.S. Cl. ........ 502/327; 502/261; 502/262; 502/302; 502/303; 502/304; 502/324; 502/326; 502/328; 502/332; 502/333; 502/334; 502/335; 502/336; 502/337; 502/338; 502/339; 502/349; 502/350; 502/351; 502/415; 502/439

(58) Field of Classification Search .................. 502/261, 502/262, 302, 303, 304, 324, 326, 327, 328, 502/332, 333, 334, 335, 336, 337, 338, 339, 502/349, 350, 351, 439, 415
See application file for complete search history.

(56) References Cited

U.S. PATENT DOCUMENTS

| | | | |
|---|---|---|---|
| 4,157,316 A | 6/1979 | Thompson et al. | |
| 4,714,693 A | 12/1987 | Targos | |
| 5,492,878 A | 2/1996 | Fujii et al. | |

(Continued)

FOREIGN PATENT DOCUMENTS

EP    1 494 304 A1    1/2005

(Continued)

OTHER PUBLICATIONS

Kai Man K. Yu et al., "Aerogel-Coated Metal Nanoparticle Colloids as Novel Entities for the Synthesis of Defined Supported Metal Catalysts", J. Phys. Chem. B 2003, 107, pp. 4515-4526.

*Primary Examiner* — Cam N. Nguyen
(74) *Attorney, Agent, or Firm* — Foley & Lardner LLP

(57) ABSTRACT

A catalyst 1 has a heat-resistant support 2 selected from among $Al_2O_3$, $SiO_2$, $ZrO_2$, and $TiO_2$, and a first metal 4 supported on an outer surface of the support 2, and included by an inclusion material 3 containing a component of the support 2.

12 Claims, 5 Drawing Sheets

U.S. PATENT DOCUMENTS

| | | | |
|---|---|---|---|
| 6,083,467 A | 7/2000 | Takeshima et al. | |
| 6,172,000 B1 | 1/2001 | Chattha et al. | |
| 6,261,989 B1 * | 7/2001 | Tanaka et al. | 502/217 |
| 6,306,794 B1 * | 10/2001 | Suzuki et al. | 502/304 |
| 6,348,430 B1 * | 2/2002 | Lindner et al. | 502/304 |
| 6,464,946 B1 * | 10/2002 | Yamada et al. | 422/177 |
| 6,682,706 B1 * | 1/2004 | Yamamoto et al. | 422/180 |
| 6,692,712 B1 * | 2/2004 | Andersen | 423/239.1 |
| 6,787,500 B2 | 9/2004 | Ito et al. | |
| 6,808,687 B1 * | 10/2004 | Uenishi et al. | 422/177 |
| 6,881,384 B1 * | 4/2005 | Uenishi et al. | 422/177 |
| 6,893,998 B2 * | 5/2005 | Shigapov et al. | 502/327 |
| 6,958,309 B2 * | 10/2005 | Wang et al. | 502/325 |
| 7,223,715 B2 * | 5/2007 | Terashima et al. | 502/339 |
| 7,235,511 B2 * | 6/2007 | Kawamoto et al. | 502/327 |
| 7,316,806 B2 * | 1/2008 | Okuno et al. | 423/651 |
| 7,374,729 B2 * | 5/2008 | Chen et al. | 422/177 |
| 7,390,768 B2 * | 6/2008 | Jordan et al. | 502/326 |
| 7,393,809 B2 * | 7/2008 | Kim | 502/326 |
| 7,446,070 B2 * | 11/2008 | Hori et al. | 502/60 |
| 7,795,172 B2 * | 9/2010 | Foong et al. | 502/327 |
| 2003/0004054 A1 | 1/2003 | Ito et al. | |
| 2004/0120865 A1 * | 6/2004 | Yamamoto et al. | 422/177 |
| 2007/0021294 A1 * | 1/2007 | Hori et al. | 502/60 |

FOREIGN PATENT DOCUMENTS

| | | |
|---|---|---|
| JP | 11-246227 A | 9/1999 |
| JP | 2000-042411 A | 2/2000 |
| JP | 2003-80077 A | 3/2003 |
| JP | 3466856 B2 | 8/2003 |
| JP | 2003-288905 A | 10/2003 |

* cited by examiner

FIG. 1
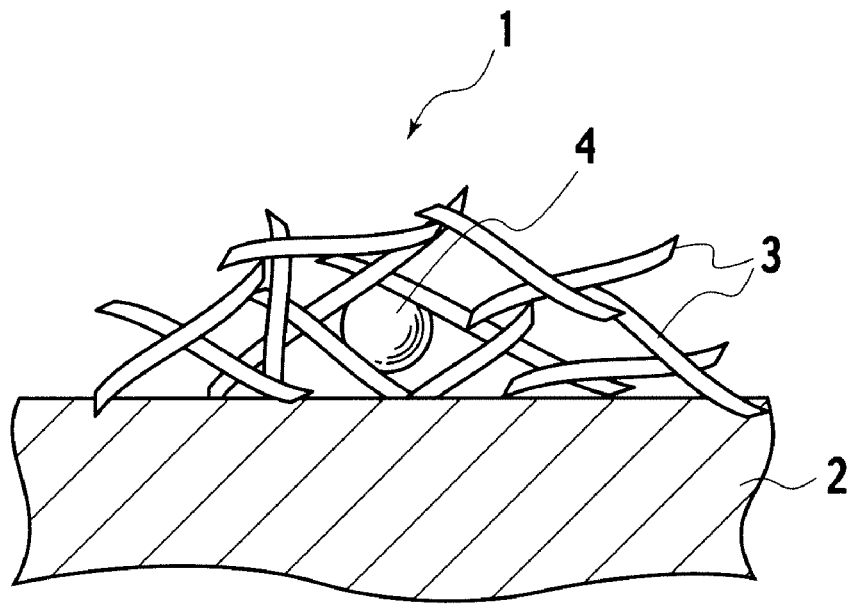
(a)
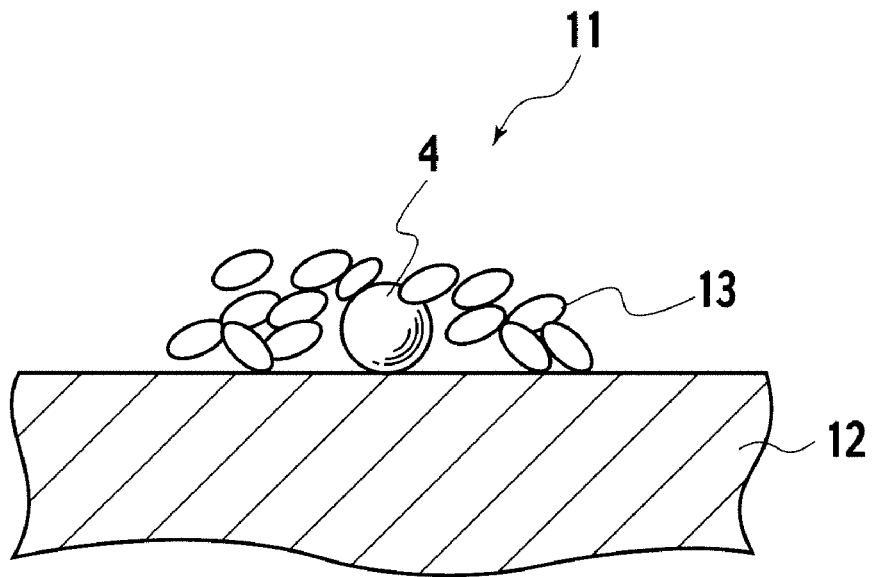
(b)

FIG. 4

| | CATALYST PRECURSORS | | | | HEAT-RESISTANT SUPPORTS | AFTER 700°C×3H BAKING | | |
|---|---|---|---|---|---|---|---|---|
| | PRECIOUS METALS | TRANSITION METALS | RARE EARTH METALS | INCLUSION MATERIALS | | PRECIOUS METAL PARTICLE SIZES (nm) | EXPOSURE RATIOS (%) | T50(NOx) |
| EMBODIMENT EX. 1 | Pt | – | – | Al₂O₃ | Al₂O₃ | 4.1 | 78 | 248 |
| EMBODIMENT EX. 2 | Pd | – | – | Al₂O₃ | Al₂O₃ | 4.9 | 69 | 267 |
| EMBODIMENT EX. 3 | Rh | – | – | Al₂O₃ | Al₂O₃ | 3.2 | 38 | 215 |
| EMBODIMENT EX. 4 | Pt | Co | – | Al₂O₃ | Al₂O₃ | 4.9 | 72 | 234 |
| EMBODIMENT EX. 5 | Pt | Mn | – | Al₂O₃ | Al₂O₃ | 4.8 | 75 | 239 |
| EMBODIMENT EX. 6 | Pd | Co | – | Al₂O₃ | Al₂O₃ | 4.8 | 61 | 253 |
| EMBODIMENT EX. 7 | Pt | Mn | Ce | Al₂O₃ | Al₂O₃ | 3.8 | 66 | 226 |
| EMBODIMENT EX. 8 | Pt | Mn | La | Al₂O₃ | Al₂O₃ | 4.4 | 68 | 234 |
| EMBODIMENT EX. 9 | Pd | Mn | Ce | Al₂O₃ | Al₂O₃ | 4.8 | 59 | 259 |
| EMBODIMENT EX. 10 | Pd | Co | Ce | Al₂O₃ | Al₂O₃ | 4.5 | 61 | 248 |
| EMBODIMENT EX. 11 | Rh | Co | Zr | Al₂O₃ | Al₂O₃ | 3.3 | 45 | 209 |
| EMBODIMENT EX. 12 | Pt | Mn | Ce | SiO₂ | SiO₂ | 3.2 | 71 | 231 |
| EMBODIMENT EX. 13 | Pd | Co | Ce | SiO₂ | SiO₂ | 3.5 | 62 | 254 |
| EMBODIMENT EX. 14 | Rh | Co | Zr | SiO₂ | SiO₂ | 3.2 | 46 | 213 |
| EMBODIMENT EX. 15 | Pt | Mn | Ce | Al₂O₃ | Al₂O₃ | 2.7 | 66 | 215 |
| EMBODIMENT EX. 16 | Pd | Mn | Ce | Al₂O₃ | Al₂O₃ | 3.1 | 66 | 238 |
| EMBODIMENT EX. 17 | Pt | Mn | Ce | Al₂O₃+La | Al₂O₃ | 66 | 2.6 | 211 |
| EMBODIMENT EX. 18 | Pd | Mn | Ce | Al₂O₃+La | Al₂O₃ | 66 | 3.7 | 235 |
| COMPARATIVE EX. 1 | Pt | – | – | – | Al₂O₃ | 20.8 | 96 | 315 |
| COMPARATIVE EX. 2 | Pt | – | – | Al₂O₃ | – | 3.7 | 48 | 261 |
| COMPARATIVE EX. 3 | Rh | – | – | Al₂O₃ | – | 1.2 | 12 | 226 |

US 8,080,494 B2

CATALYST, EXHAUST GAS PURIFYING CATALYST, AND METHOD OF PRODUCING THE CATALYST

TECHNICAL FIELD

This invention relates to a catalyst, an exhaust gas purifying catalyst, and a method of producing the catalyst, and in particular, to an exhaust gas purifying catalyst for purifying an exhaust gas to be exhausted from an internal combustion engine.

BACKGROUND ART

With a global spread of the emission control on automobiles, for purification of hydrocarbon (HC), carbon monoxide (CO), and nitrogen oxide (NOx) in exhaust gases, there have been used three-way catalysts in which microparticles of precious metals such as platinum (Pt), palladium (Pd), and rhodium (Rh) are supported on supports such as alumina ($Al_2O_3$) as a porous carrier, while the supports are further coated on a substrate such as a honeycomb of Cordierite make.

As an active site of catalyst, precious metals have a reduced active site surface area at high temperatures of a level of several hundreds of degrees centigrade, where a sintering tends to occur. To suppress the sintering, there have been taken controlling the distance between precious metal microparticles and controlling the particle size of precious metal microparticles, to be effective with precious metal microparticles to be great in size to some extent and uniformly dispersed to be supported on support surfaces. However, catalysts for automobiles are exposed typically to 800 to 900° C., and in some cases to high temperatures exceeding 1000° C., constituting the difficulty of keeping a catalytic activity at the time of catalyst production in the state of microparticles.

To this point, in Japanese Patent Publication No. 3,466, 856, there has been proposed a catalyst in which a catalytic active particle is supported in a state exposed to a support surface, and the catalytic active particle is covered by the support. Further, in Japanese Patent Unexamined Publication No. 2003-80077, there has been proposed a catalyst in which at least part of a surface of a catalytic base particle of a nanometer order is covered by a precious metal or precious metal oxide, and the surface of the catalytic base particle further has a sintering inhibitor residing thereon.

DISCLOSURE OF INVENTION

However, in the technique disclosed in the first patent document, although the catalyst support has a large surface area when prepared, the surface area of the catalyst support is reduced by a thermal deterioration of component of the support, as the temperature rises, with a progress of sintering among catalytic active particles as an active component. Further, as catalytic active particles are covered by a support component, the catalytic active particles have a reduced contact ratio to gases. Further, in the technique disclosed in the second patent document, the catalyst is prepared by using an impregnation method, and the sintering inhibitor and precious metal are simply supported on a surface of the catalytic base particle. It therefore is impossible to effectively suppress the sintering of precious metal.

The present invention has been devised to solve such problems, and according to a first aspect of the invention, in summary, a catalyst comprises a heat-resistant support selected from among $Al_2O_3$, $SiO_2$, $ZrO_2$ and $TiO_2$, and a first metal supported on an outer surface of the support, and included by an inclusion material containing a component of the support.

According to a second aspect of the invention, in summary, a method of producing a catalyst comprises preparing a heat-resistant support selected from among $Al_2O_3$, $SiO_2$, $ZrO_2$ and $TiO_2$, having a first metal included by an inclusion material containing a component of the support to form a catalyst precursor, and impregnating an outer surface of the support with the catalyst precursor.

According to a third aspect of the invention, in summary, an exhaust gas purifying catalyst comprises a catalyst layer made of a catalyst according to the first aspect of the invention.

BRIEF DESCRIPTION OF THE DRAWINGS

FIG. 1(a) is a sectional view of an essential portion of a catalyst according to an embodiment of the invention. FIG. 1(b) is a sectional view of an essential portion of a catalyst according to another example of the embodiment of the invention.

FIG. 4 is a diagram showing compositions of catalyst precursors and heat-resistant supports, as well as precious metal particle sizes, exposure ratios, and T50's, in respective embodiment examples.

BEST MODE FOR CARRYING OUT THE INVENTION

Figure 2:
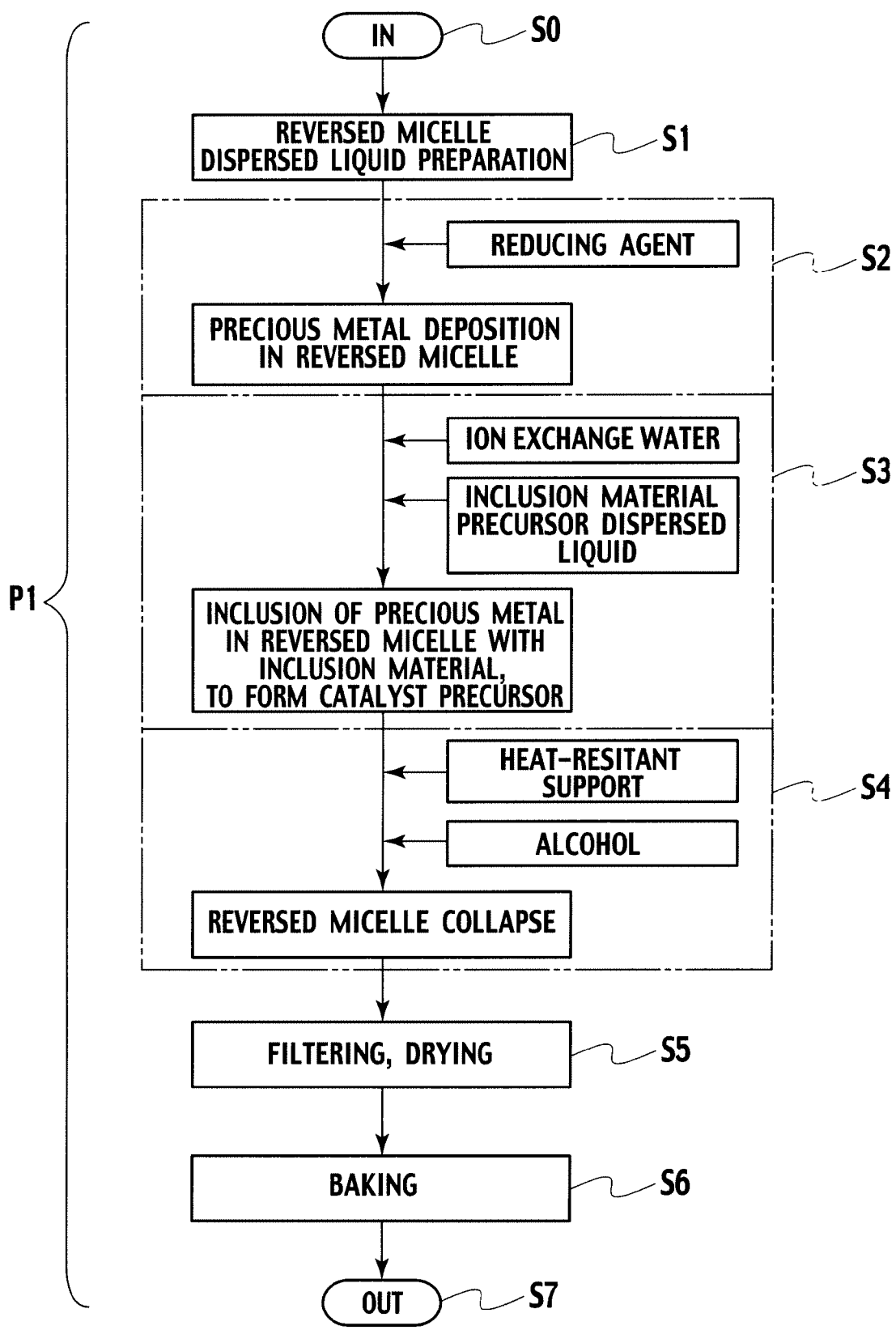
FIG. 2 is a flowchart describing a method of producing a catalyst according to an embodiment of the invention.

There will be described below into details a catalyst, an exhaust gas purifying catalyst, and a method of producing the catalyst according to embodiments of the invention.

(Catalyst)

Description is now made of a catalyst according to an embodiment of the invention. The catalyst according to the embodiment comprises a heat-resistant support selected from among $Al_2O_3$ (alumina), $SiO_2$ (silica), $ZrO_2$ (zirconia), and $TiO_2$ (titania), and a first metal supported on an outer surface of the support, and included by an inclusion material containing a component of the support.

FIG. 1 shows in section an essential portion of a catalyst 1 as an example of the catalyst according to the present embodiment, which has as the first metal a precious metal 4 supported on a heat-resistant support 2. FIG. 1(a) is a sectional view of the essential portion of the catalyst 1 according to an embodiment of the present invention. FIG. 1(b) is a sectional view of an essential portion of a catalyst 11 according to another example of the embodiment of the invention. As shown in FIG. 1(a), the catalyst 1 according to the present embodiment has, on an outer surface of the heat-resistant support 2, the precious metal 4 included by an inclusion material 3 containing a constituent component of the support 2. For this catalyst 1, the precious metal 4 is supported on the outer surface of the heat-resistant support 2, and further the precious metal 4 is included from therearound by the inclusion material 3, so that the inclusion material 3 enclosing the precious metal 4 from therearound physically fixes the precious metal 4. Further, the inclusion material 3 containing a heat-resistant support component has a heat resistance like the heat-resistant support. Therefore, the precious metal 4 as an active component is stabilized, and will not move, on the outer surface of the support 2. Accordingly, in the catalyst 1 according to the embodiment, suppression is effective to a sintering due to movements of precious metal 4, even at high temperatures. Further, for a heat resistance of the support 2, suppression is effective to a sintering due to thermal deterioration of precious metals 4, allowing a state at the time of catalyst production to be kept even after the heating. Therefore, with a maintained catalytic activity, it is allowed to obtain a catalyst excellent in heat resistance.

As used herein, the outer surface of support 7 means a surface of small pores formed in a recess shape or a slit shape in the support 7, that is, an outside excluding inner surfaces of the support 2. And, as shown in FIG. 1(*a*), the precious metal 4 is supported simply on an outer surface of the support 2, with a resultant increase in the exposure ratio of active site in the catalyst 1. It typically is a set of atoms residing on a catalyst surface that effectively functions as a catalyst, and the exhaust gas purifying function is enhanced as the exposure ratio increases.

In the case of a heat-resistant support 2 being alumina, as shown in FIG. 1(*a*), the inclusion material 3 has a fibrous form, and the precious metal 4 to be supported is included by the fibriform inclusion material 3. Like this, in cases where the inclusion material 3 is fibrous, the precious metal 4 though being included has a good contact with exhaust gases, allowing for an efficient purification of exhaust gases.

In the case of a heat-resistant support 12 being zirconia, as shown in FIG. 1(*b*), the catalyst 11 has an inclusion material 13 that is not fibrous but made of primary particles aggregated in the form of secondary particles. The precious metal 4 supported on the support 12 is disposed in a small pore of the inclusion material 13 made of the secondary particles. Like the catalyst 1, in this catalyst 11 also, the precious metal 4 though being included has a good contact with exhaust gases, allowing for an efficient purification of exhaust gases.

The first metal may preferably contain a precious metal selected from among Pt (platinum), Pd (palladium), and Rh (rhodium). These precious metals are high of catalytic activity, and effective to be used as a catalyst. Further, two or more of those precious metals, e.g. Pt and Rh, may well be mixed to be used.

In addition, in catalysts according to the present embodiment, the first metal may preferably be a composite particle containing a transition metal. Preferably, the transition metal should be a transition metal selected from among Co (cobalt), Ni (nickel), Fe (iron), and Mn (manganese). In this case, it is supposed that the precious metal contacts with the transition metal, thereby allowing for an enhanced catalytic property. This is considered due to a phenomenon called spillover in which exhaust gases adsorbed on a precious metal surface move onto a transition metal surface, where they are purified. Namely, it is considered that precious and transition metals contacting each other constitute a composite particle, whereby the precious metal has a role, not simply as a catalyst, but also as an adsorption site that adsorbs exhaust gases, so that the transition metal contacting the precious metal is activated to function as an active site where catalytic reactions occur. Such being the case, in catalysts according to the present embodiment, transition metal has a supplemental effect to the catalytic activity of precious metal, thus allowing for an enhanced catalytic activity.

Further, catalysts according to the present embodiment may preferably have a second metal selected from among Ce (cerium), La (lanthanum), Zr (zirconium), and Ba (barium). Such a second metal is supported on a support, thereby allowing the support to have an enhanced heat resistance. Further, those second metals are known as having a function of oxygen storing capability (OSC), and catalysts according to the present embodiment may well have a second metal, thereby allowing for an enhanced exhaust gas purifying performance at a low temperature. For a more enhanced effect of second metal, the second metal may preferably be supported on a vicinal region to the first metal as a catalytic active component. Among those second metals, Ce has a high suppression effect to the sintering of precious metal, as it is experimentally verified. Therefore, in cases where Ce is used as the second metal, the catalyst is allowed to have a high sintering suppressing effect, by selective disposition of Ce in a vicinity of the first metal.

Such being the case, according to the present embodiment, a catalyst comprises a heat-resistant support selected from among $Al_2O_3$, $SiO_2$, $ZrO_2$ and $TiO_2$, and a first metal supported on an outer surface of the support, and included by an inclusion material containing a component of the support, thereby allowing suppression of a sintering of the first metal due to heating, so that a dispersed state of the first metal can be held as it is at the time of catalyst production, thus allowing for provision of a catalyst excellent in heat resistance. In addition, in the case the first metal comprises a composite particle containing a precious metal and a transition metal, the precious metal contacts the transition metal, whereby catalysis of the transition metal is induced, allowing for an enhanced catalytic activity.

(Production Method of Catalyst)

Description is now made of an embodiment of a method of producing a catalyst according to the present invention. The production method of this catalyst comprises: preparing a heat-resistant support selected from among $Al_2O_3$, $SiO_2$, $ZrO_2$ and $TiO_2$; having a first metal included by an inclusion material containing a component of the support to form a catalyst precursor; and impregnating an outer surface of the support with the catalyst precursor. In the production method according to the present embodiment, an outer surface of the support is impregnated with the catalyst precursor, thereby allowing the outer surface of the support to support the first metal included by the inclusion material containing a component of the support.

The catalyst precursor may preferably be prepared by a reversed micelle method. The reversed micelle method is a method comprising: mixing in an organic solvent, a surfactant and an aqueous solution containing a catalytic active component such as a precious metal; making an aggregate of the surfactant in the organic solvent to form a reversed micelle holding therein an aqueous solution having a precious metal or the like; and causing the precious metal or the like to be deposited by precipitation or reduction in the reversed micelle, thereby forming a microparticle. The diameter of the reversed micelle depends in general on a proportion of surfactant and water, and is controllable to a prescribed size. And, the final product, which is kept from exceeding a size of the reversed micelle, has a smaller size than the reversed micelle, allowing microparticles of a uniform size to be produced with a favorable controllability. In the production method of a catalyst according to an embodiment of the present invention, by use of a reversed micelle method, a first metal as an active component is included by an inclusion material containing a component of the support to form a catalyst precursor, so that a surrounding of the first metal is included by the inclusion material, that is, a barrier of the inclusion material is formed around the first metal. Therefore, the inclusion material effects a physical immobilization of the first metal, whereby the sintering of the first metal is suppressed. Further, the support is impregnated with the catalyst precursor, and the first metal is supported simply on an outer surface of the support. Like this, for catalysts produced by a production method of catalyst according to an embodiment of the present invention, the sintering of a first metal due to heating can be suppressed, so that a dispersed state of the first metal can be held as it is at the time of catalyst production, thus allowing for provision of a catalyst excellent in heat resistance.

To obtain the above-noted effects, it is noted that the first metal may preferably comprise a precious metal selected from among Pt, Pd, and Rh. Further, among them, two or more precious metals, e.g. Pt and Rh, may well be mixed to be used. Further, the first metal may preferably comprise a composite particle further containing a transition metal, and preferably the transition metal should be at least one kind of transition metal selected from a group including Co, Ni, Fe, and Mn. Further, there may well be added the second metal selected from among Ce, La, Zr, and Ba. The second metal to be used may well be Ce, and preferably the inclusion material should contain Ce for provision of a catalyst with an enhanced heat resistance.

FIG. 2 is a flowchart describing a schematic process in a method of producing a catalyst. FIG. 2 shows a case in which simply a precious metal is supported as the first metal. Description is now made of a process P1. At a step S0, the process P1 is entered, where first a reversed micelle dispersed liquid preparation process S1 is to be performed. In this process S1, a surfactant is dissolved in an organic solvent for preparation of a mixed solution. As the organic solvent, there may be used cyclohexane, cycloheptane, octanol, isooctane, n-hexane, n-decane, benzene, toluene, xylene, or such. Further, a mixed solution of two or more of them may be used. As the surfactant, there may be used polyethyleneglycol-mono 4-nonyl phenyl ether, pentaethyleneglycol dodecyl ether, or the like. A salt of a precious metal is put in this mixed solution, which is stirred to prepare a reversed micelle dispersed liquid. The reversed micelle has surfactants arrayed inside a periphery of a spherical droplet of a diameter about ten and several nanometers, with their hydrophilic groups outwardly oriented and hydrophobic groups inwardly oriented, and includes an aqueous solution containing a salt of a precious metal in a water phase inside the reversed micelle. As the precious metal salt, there may be used a nitrate, acetate, chloride, amine compound, carbonyl compound, metal alkoxide, etc. Further, there may be used a mixed solution of two or more of them.

Next to be performed is a process S2 for deposition of a precious metallic metal in the reversed micelle. In this process S2, a reducing agent of the precious metal is put in the reversed micelle dispersed liquid, which is stirred, so that the salt of the precious metal in the reversed micelle is reduced and deposited as a precious metallic metal inside the reversed micelle. As the reducing agent, there may be used, for example, ammonia, tetramethylammonium, an alkali metal hydroxide such as sodium hydroxide, hydrazine, boronohydrogen sodium, etc.

Then, to be performed is a process S3 for including the precious metallic metal in the reversed micelle by an inclusion material to form a catalyst precursor. In the S3, ion-exchanged water is added in the reversed micelle dispersed liquid, and thereafter, a dispersion liquid of a precursor of the inclusion material is added, whereby in the reversed micelle, the precious metallic metal is included by the precursor of the inclusion material, thus forming the catalyst precursor. The precursor of the inclusion material contains a heat-resistant support component selected from among $Al_2O_3$, $SiO_2$, $ZrO_2$, and $TiO_2$, and is used in the state of hydroxide. It is now noted that a salt of a raw material of the inclusion material for including the first metal may be prepared, not simply by using a metal alkoxide for the hydrolysis for deposition in the reverse micelle, but also by capsuling in the reverse micelle a salt having an ion of the raw material of the inclusion material, for controlling a pH in the reversed micelle to effect deposition of a hydroxide of the raw material of the inclusion material.

Next to be performed is a reversed micelle collapsing process S4. In the S4, heat-resistant supports are put in the dispersion liquid obtained in S3, which is sufficiently stirred, and thereafter, an alcohol is added, thereby collapsing reversed micelles. By the reverse micelle collapse, there are caused precipitates in which heat-resistant support are impregnated with catalyst precursors. It is now noted that preferably, the heat-resistant support to be used should be a heat-resistant support selected from among $Al_2O_3$, $SiO_2$, $ZrO_2$, and $TiO_2$, and to minimize the thermal deterioration, the support should be baked before use, at high temperatures. Further, in the impregnation process, the better the stirring time will be, the longer it is, and the pH in the reverse micelle may preferably be kept alkaline. Further, the supports impregnated with catalyst precursors may preferably be baked in an atomized state for separation from the solution. It is noted that as the alcohol, there may be used, for example, methanol, ethanol, and the like.

Next to be performed is a filtering and drying process S5. In the S5, the precipitates obtained in S4 is filtered by a membrane filter, and then washed by using an alcohol to remove impurities, e.g. surfactants or such, contained in the precipitates, and the precipitates are dried at 120° C.

Then, to be performed is a baking process S6. In the S6, the precipitates after the drying in S5 is baked at a temperature of 400° C. in air streams. Then, at a step S7, the process P1 ends, obtaining a desired catalyst.

In the catalyst obtained, the precious metal is supported on an outer surface of the support, in a state included by the inclusion material containing a heat-resistant support component, which allows for suppression of a sintering due to movement of the precious metal and a sintering of the precious metal due to thermal deterioration of the support. Further, the catalytic active site is put in an exposed state to the outer surface of the support, thus allowing for an enhanced catalytic property.

It is noted that in the case of a combination of precious metal and transition metal used as the first metal, a salt of the transition metal is added when a solution of a salt of the precious metal is put in the mixed solution at the S1. Further, for addition of the second metal, a salt of the second metal is added as an aqueous solution, after deposition of the precious metal as a metal in S2. This case allows a selective disposition of the second metal in surroundings of the precious and transition metals as active site components, allowing for an enhancement of catalytic property at low temperatures.

It is noted that the catalyst may be produced by a method else than the reversed micelle method. For example, a precursor that has a first metal in Ce may be prepared, and once dried, before its dispersion to be done again to the solution. By deposition of the precursor of a support component in this solution, it is allowed to prepare the first metal in a state of Ce included by an inclusion material containing a support component deposited around a precious metal. Further, for the preparation, there may be used a corpuscle preparation method such as a co-precipitation method or a sol-gel method.

Such being the case, in a catalyst production method according to an embodiment of the present invention, by preparing a heat-resistant support selected from among $Al_2O_3$, $SiO_2$, $ZrO_2$ and $TiO_2$, having a first metal included by an inclusion material containing a component of the support to form a catalyst precursor, and impregnating an outer surface of the support with the catalyst precursor, it is allowed to provide a catalyst comprising a heat-resistant support selected from among $Al_2O_3$, $SiO_2$, $ZrO_2$, and $TiO_2$, and a first metal supported on an outer surface of the support, and included by an inclusion material containing a component of the support.

It is noted that in the method of producing a catalyst according to the present embodiment, as the catalyst has a different catalytic activity depending on the kind of its element, and the condition of use or such, there may be given adequate modifications to the kind of element or reducing agent to be used, as well as the reaction temperature, reaction time, stirring strength, stirring method, or the like, to provide a desirable catalytic activity.

(Exhaust Gas Purifying Catalyst)

Description is now made of an embodiment of an exhaust gas purifying catalyst according to the present invention. The exhaust gas purifying catalyst according to the present embodiment has a described catalyst contained in a catalyst layer coated on the surface of a wall, such as a honeycomb support. As described, the exhaust gas purifying catalyst according to the present embodiment has a catalyst layer comprising a heat-resistant support selected from among $Al_2O_3$, $SiO_2$, $ZrO_2$, and $TiO_2$, and a first metal supported on an outer surface of the support, and included by an inclusion material containing a component of the support, so that a dispersed state of the first metal can be held as it is at the time of catalyst production, thus allowing for provision of a catalyst excellent in heat resistance.

Mode for the Invention

There will be described below a catalyst, a method of producing a catalyst, and an exhaust gas purifying catalyst according to the present invention, more specifically by embodiment example 1 to embodiment example 18 and comparative example 1 to comparative example 3, while the scope of the present invention is not limited to those embodiment examples. It is noted that the embodiment examples are for examining the effectiveness of an exhaust gas purifying catalyst according to the present invention, and illustrating examples of exhaust gas purifying catalyst prepared with different materials.

<Preparation of Samples>

Embodiment Example 1

In embodiment example 1, a catalyst precursor having Pt included by alumina inside a reversed micelle was formed, and thereafter, the catalyst precursor was supported on alumina baked at 700° C. To 5 liters of cyclohexane, 330 g of polyethyleneglycol-mono4-nonylphenylether (NP5) was added as a surfactant, and thereafter, as a precious metal salt solution, 0.35 g of 8.46% dinitro diamineplatinum solution diluted with 40.13 ml of ion exchange water was mixed, which was stirred for 2 hours, preparing a reversed micelle dispersed liquid containing Pt ions (S1). Next, to the reversed micelle dispersed liquid, 0.02 g of sodium borohydride was added as a reducing agent, metalating Pt ions, obtaining a dispersion liquid having reversed micelles containing Pt metal (S2). To the dispersion liquid prepared in S2, 229.47 ml of ion exchange water was added, and thereafter, 20 g of aluminium isopropoxide dispersed as an inclusion material precursor to 80 ml of cyclohexane was delivered by drops to the dispersion liquid prepared in S2, obtaining a dispersion liquid with reversed micelles having Pt metal included by aluminium hydroxide therein (S3). The dispersion liquid prepared in S3 and 5 g of $Al_2O_3$ of a specific surface area of 200 $m^2$/g baked at 700° C. as heat-resistant supports were mixed in a single container, and stirred for 2 hours, and further 500 ml of methanol was added, collapsing reversed micelles in the dispersion liquid (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pt supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in a Cordierite make honeycomb support (900 cells/2.5 mills, capacity 0.06 lit.), while surplus slurry was removed by air streams, which was dried at 120° C., and baked in air streams of 400° C., obtaining a catalyst of the embodiment example 1. It is noted that the term cells represents the number of cells per one-inch (approx. 2.54 cm) square. The term mills represents a wall thickness of honeycomb, one mill being a length of $1/1000$ inches (approx. 25.4 micrometers).

Embodiment Example 2

In embodiment example 2, a catalyst precursor having Pd included by alumina inside a reversed micelle was formed, and thereafter, the catalyst precursor was supported on alumina baked at 700° C. To 5 liters of cyclohexane, 330 g of NP5 was added as a surfactant, and thereafter, as a precious metal salt solution, 0.145 g of 20.76% palladium nitrate solution diluted with 40.37 ml of ion exchange water was mixed, which was stirred for 2 hours, preparing a reversed micelle dispersed liquid containing Pd ions (S1). Next, to the reversed micelle dispersed liquid, 0.03 g of sodium borohydride was added as a reducing agent, metalating Pd ions, obtaining a dispersion liquid having reversed micelles containing Pd metal (S2). To the dispersion liquid prepared in S2, 229.5 ml of ion exchange water was added, and thereafter, 20 g of aluminium isopropoxide dispersed as an inclusion material precursor to 80 ml of cyclohexane was delivered by drops to the dispersion liquid prepared in S2, obtaining a dispersion liquid with reversed micelles having Pd metal included by aluminium hydroxide therein (S3). The dispersion liquid prepared in S3 and 5 g of $Al_2O_3$ of a specific surface area of 200 $m^2$/g baked at 700° C. as heat-resistant supports were mixed in a single container, and stirred for 2 hours, and further 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pd supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 2.

Embodiment Example 3

In embodiment example 3, a catalyst precursor having Rh included by alumina inside a reversed micelle was formed, and thereafter, the catalyst precursor was supported on alumina baked at 700° C. To 5 liters of cyclohexane, 330 g of NP5 was added as a surfactant, and thereafter, as a metal salt solution, 0.22 g of 13.81% rhodium nitrate solution diluted with 40.29 ml of ion exchange water was mixed, which was stirred for 2 hours, preparing a reversed micelle dispersed liquid containing Rh ions (S1). Next, to the reversed micelle dispersed liquid, 0.03 g of sodium borohydride was added as a reducing agent, metalating Rh ions, obtaining a dispersion liquid having reversed micelles containing Rh metal (S2). To the dispersion liquid prepared in S2, 229.5 ml of ion exchange water was added, and thereafter, 20 g of aluminium isopropoxide dispersed as an inclusion material precursor to 80 ml of cyclohexane was delivered by drops to the dispersion liquid prepared in S2, obtaining a dispersion liquid with reversed micelles having Rh metal included by aluminium hydroxide therein (S3). The dispersion liquid prepared in S3 and 5 g of $Al_2O_3$ of a specific surface area of 200 $m^2/g$ baked at 700° C. as heat-resistant supports were mixed in a single container, and stirred for 2 hours, and further 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Rh supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 3.

Embodiment Example 4)

In embodiment example 4, a catalyst precursor having Pt and Co included by alumina inside a reversed micelle was formed, and thereafter, the catalyst precursor was supported on alumina baked at 700° C. To 5 liters of cyclohexane, 330 g of NP5 was added as a surfactant, and thereafter, as a metal salt solution, 0.35 g of 8.46% dinitro diamineplatinum solution diluted with 39.17 ml of ion exchange water and 2.60 g of cobalt nitrate were mixed, which was stirred for 2 hours, preparing a reversed micelle dispersed liquid containing Pt ions and Co ions (S1). Next, to the reversed micelle dispersed liquid, 1.36 g of hydrazine was added as a reducing agent, metalating Pt ions and Co ions, obtaining a dispersion liquid having reversed micelles containing Pt metal and Co metal (S2). To the dispersion liquid prepared in S2, 229.5 ml of ion exchange water was added, and thereafter, 20 g of aluminium isopropoxide dispersed as an inclusion material precursor to 80 ml of cyclohexane was delivered by drops to the dispersion liquid prepared in S2, obtaining a dispersion liquid with reversed micelles having Pt metal and Co metal included by aluminium hydroxide therein (S3). The dispersion liquid prepared in S3 and 5 g of $Al_2O_3$ of a specific surface area of 200 $m^2/g$ baked at 700° C. as heat-resistant supports were mixed in a single container, and stirred for 2 hours, and further 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pt and 5 wt % of Co supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 4.

Embodiment Example 5

In embodiment example 5, a catalyst precursor having Pt and Mn included by alumina inside a reversed micelle was formed, and thereafter, the catalyst precursor was supported on alumina baked at 700° C. To 5 liters of cyclohexane, 330 g of NP5 was added as a surfactant, and thereafter, as a metal salt solution 0.35 g of 8.46% dinitro diamineplatinum solution diluted with 39.17 ml of ion exchange water and 2.12 g of manganese acetate were mixed, which was stirred for 2 hours, preparing a reversed micelle dispersed liquid containing Pt ions and Mn ions (S1). Next, to the reversed micelle dispersed liquid, 1.36 g of hydrazine was added as a reducing agent, metalating Pt ions and Mn ions, obtaining a dispersion liquid having reversed micelles containing Pt metal and Mn metal (S2). To the dispersion liquid prepared in S2, 229.5 ml of ion exchange water was added, and thereafter, 20 g of aluminium isopropoxide dispersed as an inclusion material precursor to 80 ml of cyclohexane was delivered by drops to the dispersion liquid prepared in S2, obtaining a dispersion liquid with reversed micelles having Pt metal and Mn metal included by aluminium hydroxide therein (S3). The dispersion liquid prepared in S3 and 5 g of $Al_2O_3$ of a specific surface area of 200 $m^2/g$ baked at 700° C. as heat-resistant supports were mixed in a single container, and stirred for 2 hours, and further 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pt and 5 wt % of Mn supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 5.

Embodiment Example 6

In embodiment example 6, a catalyst precursor having Pd and Co included by alumina inside a reversed micelle was formed, and thereafter, the catalyst precursor was supported on alumina baked at 700° C. To 5 liters of cyclohexane, 330 g of NP5 was added as a surfactant, and thereafter, as a metal salt solution, 0.145 g of 20.76% palladium nitrate solution diluted with 40.37 ml of ion exchange water and 2.60 g of cobalt nitrate were mixed, which was stirred for 2 hours, preparing a reversed micelle dispersed liquid containing Pd ions and Co ions (S1). Next, to the reversed micelle dispersed liquid, 1.38 g of hydrazine was added as a reducing agent, metalating Pd ions and Co ions, obtaining a dispersion liquid having reversed micelles containing Pd metal and Co metal (S2). To the dispersion liquid prepared in S2, 229.5 ml of ion exchange water was added, and thereafter, 20 g of aluminium isopropoxide dispersed as an inclusion material precursor to 80 ml of cyclohexane was delivered by drops to the dispersion liquid prepared in S2, obtaining a dispersion liquid with reversed micelles having Pd metal and Co metal included by aluminium hydroxide therein (S3). The dispersion liquid prepared in S3 and 5 g of $Al_2O_3$ of a specific surface area of 200 $m^2/g$ baked at 700° C. as heat-resistant supports were mixed in a single container, and stirred for 2 hours, and 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pd and 5 wt % of Co supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 6.

Embodiment Example 7

In embodiment example 7, a catalyst precursor having Pt, Mn, and Ce included by alumina inside a reversed micelle was formed, and thereafter, the catalyst precursor was supported on alumina baked at 700° C. To 5 liters of cyclohexane, 330 g of NP5 was added as a surfactant, and thereafter, as a metal salt solution, 0.35 g of 8.46% dinitro diamineplatinum solution diluted with 39.17 ml of ion exchange water and 2.12 g of manganese acetate were mixed, which was stirred for 2 hours, preparing a reversed micelle dispersed liquid containing Pt ions and Mn ions (S1). Next, to the reversed micelle dispersed liquid, 1.36 g of hydrazine was added as a reducing agent, metalating Pt ions and Mn ions, obtaining a dispersion liquid having reversed micelles containing Pt metal and Mn metal (S2). To the dispersion liquid prepared in S2, a dispersion liquid having 3.86 g of cerium nitrate dispersed in 20 ml of ion exchange water was added, in order for $CeO_2$ to finally occupy 10% of the entirety, and thereafter, 209.5 ml of ammonia water was added. Further, 20 g of aluminium isopropoxide dispersed as an inclusion material precursor to 80 ml of cyclohexane was delivered by drops to the dispersion liquid prepared in S2, obtaining a dispersion liquid with reversed micelles having Pt metal, Mn metal, and cerium hydroxide included by aluminium hydroxide therein (S3). The dispersion liquid prepared in S3 and 5 g of $Al_2O_3$ of a specific surface area of 200 $m^2/g$ baked at 700° C. as heat-resistant supports were mixed in a single container, and stirred for 2 hours, and 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pt, 5 wt % of Mn, and 10 wt % of $CeO_2$ supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 7.

Embodiment Example 8

In embodiment example 8, a catalyst precursor having Pt, Mn, and La included by alumina inside a reversed micelle was formed, and thereafter, the catalyst precursor was supported on alumina baked at 700° C. Here, by like processes to the embodiment example 7, a dispersion liquid was obtained, with reversed micelles having Pt metal, Mn metal, and lanthanum hydroxide included by aluminium hydroxide therein, so as to contain 0.3 wt % of Pt, 5 wt % of Mn, and 10 wt % of La to 10 g of alumina (S3). The dispersion liquid prepared in S3 and 5 g of $Al_2O_3$ of a specific surface area of 200 $m^2/g$ baked at 700° C. as heat-resistant supports were mixed in a single container, and stirred for 2 hours, and further 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pt, 5 wt % of Mn, and 10 wt % of La supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 8.

Embodiment Example 9

In embodiment example 9, a catalyst precursor having Pt, Mn, and Ce included by alumina inside a reversed micelle was formed, and thereafter, the catalyst precursor was supported on alumina baked at 700° C. Here, by like processes to the embodiment example 7, a dispersion liquid was obtained, with reversed micelles having Pt metal, Mn metal, and cerium hydroxide included by aluminium hydroxide therein, so as to contain 0.3 wt % of Pt, 5 wt % of Mn, and 10 wt % of Ce to 10 g of alumina (S3). The dispersion liquid prepared in S3 and 5 g of $Al_2O_3$ of a specific surface area of 200 $m^2/g$ baked at 700° C. as heat-resistant supports were mixed in a single container, and stirred for 2 hours, and further 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pt, 5 wt % of Mn, and 10 wt % of Ce supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 9.

Embodiment Example 10

In embodiment example 10, a catalyst precursor having Pd, Co, and Ce included by alumina inside a reversed micelle was formed, and thereafter, the catalyst precursor was supported on alumina baked at 700° C. Here, by like processes to the embodiment example 7, a dispersion liquid was obtained, with reversed micelles having Pd metal, Co metal, and cerium hydroxide included by aluminium hydroxide therein, so as to contain 0.3 wt % of Pd, 5 wt % of Co, and 10 wt % of Ce to 10 g of alumina (S3). The dispersion liquid prepared in S3 and 5 g of $Al_2O_3$ of a specific surface area of 200 $m^2$/g baked at 700° C. as heat-resistant supports were mixed in a single container, and stirred for 2 hours, and further 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pd, 5 wt % of Co, and 10 wt % of Ce supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 10.

Embodiment Example 11

In embodiment example 11, a catalyst precursor having Rh, Co, and Zr included by alumina inside a reversed micelle was formed, and thereafter, the catalyst precursor was supported on alumina baked at 700° C. Here, by like processes to the embodiment example 7, a dispersion liquid was obtained, with reversed micelles having Rh metal, Co metal, and zirconium hydroxide included by aluminium hydroxide therein, so as to contain 0.3 wt % of Rh, 5 wt % of Co, and 10 wt % of Zr to 10 g of alumina (S3). The dispersion liquid prepared in S3 and 5 g of $Al_2O_3$ of a specific surface area of 200 $m^2$/g baked at 700° C. as heat-resistant supports were mixed in a single container, and stirred for 2 hours, and further 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Rh, 5 wt % of Co, and 10 wt % of Zr supported to 10 g of alumina (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 11.

Embodiment Example 12

In embodiment example 12, a catalyst precursor having Pt, Mn, and Ce included by silica inside a reversed micelle was formed, and thereafter, the catalyst precursor was supported on silica baked at 700° C. To 5 liters of cyclohexane, 330 g of NP5 was added as a surfactant, and thereafter, as a metal salt solution 0.35 g of 8.46% dinitro diamineplatinum solution diluted with 39.17 ml of ion exchange water and 2.12 g of manganese acetate were mixed, which was stirred for 2 hours, preparing a reversed micelle dispersed liquid containing Pt ions and Mn ions (S1). Next, to the reversed micelle dispersed liquid, 1.36 g of hydrazine was added as a reducing agent, metalating Pt ions and Mn ions, obtaining a dispersion liquid having reversed micelles containing Pt metal and Mn metal (S2). To the dispersion liquid prepared in S2, a dispersion liquid having 3.86 g of cerium nitrate dispersed in 20 ml of ion exchange water was added, in order for $CeO_2$ to finally occupy 10% of the entirety, and thereafter, 209.5 ml of ammonia water was added. Further, 17.33 of tetraethoxysilane dispersed as an inclusion material precursor to 80 ml of cyclohexane was delivered by drops to the dispersion liquid prepared in S2, obtaining a solution with reversed micelles having Pt metal, Mn metal, and Ce included by hydroxide of silica therein (S3). The dispersion liquid prepared in S3 and 5 g of $SiO_2$ of a specific surface area of 200 $m^2$/g baked at 700° C. as heat-resistant supports were mixed in a single container, and stirred for 2 hours, and 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pt, 5 wt % of Mn, and 10 wt % of Ce supported to 10 g of $SiO_2$ (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 12.

Embodiment Example 13

In embodiment example 13, a catalyst precursor having Pd, Co, and Ce included by silica inside a reversed micelle was formed, and thereafter, the catalyst precursor was supported on silica baked at 700° C. Here, by like processes to the embodiment example 12, a solution was obtained, with reversed micelles having Pd metal, Co metal, and Ce included by hydroxide of silica therein, so as to contain 0.3 wt % of Pd, 5 wt % of Co, and 10 wt % of Ce (S3). The dispersion liquid prepared in S3 and 5 g of $SiO_2$ of a specific surface area of 200 $m^2$/g baked at 700° C. as heat-resistant supports were mixed in a single container, and stirred for 2 hours, and 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Pd, 5 wt % of Co, and 10 wt % of Ce supported to 10 g of $SiO_2$ (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 13.

Embodiment Example 14

In embodiment example 14, a catalyst precursor having Rh, Co, and Zr included by silica inside a reversed micelle was formed, and thereafter, the catalyst precursor was supported on silica baked at 700° C. Here, by like processes to the embodiment example 12, a solution was obtained, with reversed micelles having Rh metal, Co metal, and Zr included by hydroxide of silica therein, so as to contain 0.3 wt % of Rh, 5 wt % of Co, and 10 wt % of Zr (S3). The dispersion liquid prepared in S3 and 5 g of $SiO_2$ of a specific surface area of 200 $m^2/g$ baked at 700° C. as heat-resistant supports were mixed in a single container, and stirred for 2 hours, and 500 ml of methanol was added, collapsing reversed micelles (S4). Obtained precipitates were filtered by a membrane filter, and thereafter, washed by using an alcohol, and the precipitates were dried at 120° C. (S5). After the drying, the precipitates were baked at a temperature of 400° C. in air streams, obtaining a powdery catalyst having 0.3 wt % of Rh, 5 wt % of Co, and 10 wt % of Zr supported to 10 g of $SiO_2$ (S6). Operations of S1 to S6 were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 14.

Embodiment Example 15

In embodiment example 15, a catalyst precursor was formed, in which inside a reversed micelle a deposition of Ce was made selectively around Pt and Mn and followed by an inclusion thereof by alumina, and the catalyst precursor was supported on alumina baked at 700° C. To 5 liters of cyclohexane, 330 g of NP5 was added as a surfactant, and thereafter, as a metal salt solution, 0.35 g of 8.46% dinitro diamineplatinum solution diluted with 39.17 ml of ion exchange water and 2.12 g of manganese acetate were mixed, which was stirred for 2 hours, preparing a reversed micelle dispersed liquid containing Pt ions and Mn ions (S1). Next, to the reversed micelle dispersed liquid, 1.36 g of hydrazine was added as a reducing agent, metalating Pt ions and Mn ions, obtaining a dispersion liquid having reversed micelles containing Pt metal and Mn metal (S2). To the dispersion liquid prepared in S2, a dispersion liquid having 3.86 g of cerium nitrate dispersed in 20 ml of ion exchange water was added, in order for $CeO_2$ to finally occupy 10% of the entirety, and thereafter, 209.5 ml of ammonia water was added. To an obtained solution, 500 ml of methanol was added, thereby collapsing reversed micelles, obtaining precipitates, which were filtered by a membrane filter, and thereafter, washed by using an alcohol, and the precipitates were dried at 120° C. Obtained precipitates were shaken to crush, and thereafter, made colloidal by using a polymer, and dispersed again in a cyclohexane solution. Next, as an inclusion material precursor, 20 g of aluminium isopropoxide was dispersed in 80 ml of cyclohexane, which was delivered by drops into the colloid-containing cyclohexane prepared above, obtaining a dispersion liquid having Pt metal and Mn metal selectively disposed in vicinities of cerium hydroxide and included by aluminium hydroxide. The dispersion liquid prepared and 5 g of $Al_2O_3$ of a specific surface area of 200 $m^2/g$ baked at 700° C. as heat-resistant supports were mixed in a single container, which was stirred for 2 hours, obtaining precipitates, which were filtered by a membrane filter, and after a drying process, the precipitates were baked in air streams at a temperature of 400° C., obtaining a powdery catalyst having 0.3 wt % of Pt, 5 wt % of Mn, and 10 wt % of $CeO_2$ supported to 10 g of alumina. The foregoing operations were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 15.

Embodiment Example 16

In embodiment example 16, a catalyst precursor was formed, in which inside a reversed micelle a deposition of Ce was made selectively around Pd and Mn and followed by an inclusion thereof by alumina, and the catalyst precursor was supported on alumina baked at 700° C. Here, like processes to the embodiment example 15 were applied, obtaining a powdery catalyst having 0.3 wt % of Pd, 5 wt % of Mn, and 10 wt % of $CeO_2$ supported to 10 g of alumina. The foregoing operations were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 16.

Embodiment Example 17

In embodiment example 17, a catalyst precursor was formed, in which inside a reversed micelle a deposition of Ce was made selectively around Pt and Mn and followed by an inclusion thereof by alumina having 3 wt % of La added thereto, and the catalyst precursor was supported on alumina baked at 700° C. Here, like processes to the embodiment example 15 were applied, obtaining a powdery catalyst having 0.3 wt % of Pt, 5 wt % of Mn, and 10 wt % of $CeO_2$ supported to 10 g of alumina. The foregoing operations were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 17.

Embodiment Example 18

In embodiment example 18, a catalyst precursor was formed, in which inside a reversed micelle a deposition of Ce was made selectively around Pd and Mn and followed by an inclusion thereof by alumina having 3 wt % of La added thereto, and the catalyst precursor was supported on alumina baked at 700° C. Here, like processes to the embodiment example 15 were applied, obtaining a powdery catalyst having 0.3 wt % of Pd, 5 wt % of Mn, and 10 wt % of $CeO_2$ supported to 10 g of alumina. The foregoing operations were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the embodiment example 18.

Comparative Example 1

In comparative example 1, Pt was supported on alumina baked at 700° C. Dinitro diamine platinum was supported on $Al_2O_3$ of a specific surface area of 200 $m^2$/g baked at 700° C., so as to be 0.3 wt %, which was dried at 120° C. round the clock, and baked at 400° C. for one hour. 50 g of obtained catalyst powder, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the comparative example 1.

Comparative Example 2

In comparative example 2, Pt was included by alumina in a reversed micelle. To 5 liters of cyclohexane, 330 g of NP5 was added as a surfactant, and thereafter, as a metal salt solution, 0.35 g of 8.46% dinitro diamineplatinum solution diluted with 40.13 ml of ion exchange water was mixed, which was stirred for 2 hours, preparing a reversed micelle dispersed liquid containing Pt ions. Next, to the reversed micelle dispersed liquid, 0.02 g of sodium borohydride was added as a reducing agent, metalating Pt ions, obtaining a dispersion liquid having reversed micelles containing Pt metal. To the dispersion liquid prepared, 229.47 ml of ion exchange water was added, and thereafter, 40 g of aluminium isopropoxide dispersed as an inclusion material precursor to 160 ml of cyclohexane was delivered by drops to the dispersion liquid prepared, obtaining a dispersion liquid with reversed micelles having Pt metal included by aluminium hydroxide therein. The dispersion liquid prepared was stirred for 2 hours, and 500 ml of methanol was added, collapsing reversed micelles. Obtained precipitates were filtered by a membrane filter, and thereafter, washed by using an alcohol, and the precipitates were dried at 120° C. After the drying, the precipitates were baked at a temperature of 400° C. in air streams, obtaining a powdery catalyst having 0.3 wt % of Pt supported to 10 g of $Al_2O_3$. The foregoing operations were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the comparative example 2.

Comparative Example 3

In comparative example 3, Rh was included by alumina in a reversed micelle. To 5 liters of cyclohexane, 330 g of NP5 was added as a surfactant, and thereafter, as a metal salt solution, 0.22 g of 13.81% rhodium nitrate solution diluted with 40.29 ml of ion exchange water was mixed, which was stirred for 2 hours, preparing a reversed micelle dispersed liquid containing Rh ions. Next, to the reversed micelle dispersed liquid, 0.03 g of sodium borohydride was added as a reducing agent, metalating Rh ions, obtaining a dispersion liquid having reversed micelles containing Rh metal. To the dispersion liquid prepared, 229.5 ml of ion exchange water was added, and thereafter, 40 g of aluminium isopropoxide dispersed as an inclusion material precursor to 160 ml of cyclohexane was delivered by drops, obtaining a dispersion liquid with reversed micelles having Rh metal included by aluminium hydroxide therein. The dispersion liquid prepared was stirred for 2 hours, and 500 ml of methanol was added, collapsing reversed micelles, obtaining precipitates, which were filtered by a membrane filter, and thereafter, washed by using an alcohol, and the precipitates were dried at 120° C. After the drying, the precipitates were baked at a temperature of 400° C. in air streams, obtaining a powdery catalyst having 0.3 wt % of Rh supported to 10 g of $Al_2O_3$. The foregoing operations were repeated to obtain catalyst powder, of which 50 g, 10 g of boehmite, and 157 g of aqueous solution containing 10% nitric acid were put in an alumina make magnetic jar, and shaken to crush together with alumina balls, obtaining a catalyst slurry. In addition, this catalyst slurry was put in Cordierite make honeycomb support, while surplus slurry was removed by air streams, which was dried at 120° C., and baked in air streams of 400° C., obtaining a catalyst of the comparative example 3.

It is now noted that respective samples obtained by the foregoing sample preparation were baked for 3 hours at 700° C. in air streams, and thereafter, their precious metal particle sizes were measured by a TEM (transmission electron microscope), and exposure rates and 50%-conversion ratio temperatures (T50) were calculated.

<Particle Size Measurement of Precious Metal Particles>

For catalysts obtained by the foregoing sample preparation, their TEM-EDX measurements were made after baking. For the measurements, a Hitachi Limited make HF-2000 was used, with an acceleration voltage of 200 kV and a cutting condition under normal temperature. For the method of measurement, catalyst powder was enveloped by an epoxy resin, and after the epoxy resin was hardened, an ultra microtome was used to prepare ultra-thin cut pieces. These cut pieces were employed to examine a dispersion of various crystal particles. In a picked up image, a contrast (shadow) region was focused to discriminate species of metal, and measure their particles sizes.

<Measurement of Unit CO Adsorption>

To determine a ratio of exposure, the unit CO adsorption was measured. For measurements of unit CO (carbon monoxide) adsorption, a Japan Bell Company Ltd make metal dispersion measuring device BEL-METAL-3 was employed, and the following procedure of measurement was followed. Samples were heated by 10° C./min up to 400° C. in streams of a He 100% gas, and oxidation-processed for 15 minutes in streams of an $O_2$ 100% gas. Then, after a 5-minute purge by a He 100% gas, they were reduction-processed for 15 minutes in streams of a H 240%/He balance gas at 400° C. Next, they were cooled down to 50° C. in streams of a He 100% gas. And, a CO 10%/He balance gas was let to inflow in a pulsing manner, for the determination.

<Calculation of Exposure Ratio>

As will be used below, the term exposure ratio means a proportion that, out of precious metal residing on a heat resistant support, such precious metal has as being exposed to the outer surface of the support. The exposure ratio is calculated from a ratio between a precious metal outer surface area (PMSA) to be calculated from the above-noted CO adsorption and a theoretical particle surface area (TSA) to be calculated from particle sizes resultant from a TEM observation. For particles under TEM observation, such precious metal may also be observed as not being exposed to the support surface. Therefore, if an entirety of precious metal were exposed to the support surface, there would be achieved an adsorption of gas stoichiometrically adsorbed to the precious metal surface area. However, in cases where precious metal is included by the support surface, there will not be achieved an adsorption of gas stoichiometrically adsorbed to the precious metal surface area to be determined from particle sizes. Accordingly, from precious metal particles sizes observed by a TEM and an adsorption of gas actually adsorbed to the sample, the proportion of surface areas of precious metal exposed to the support surface is calculated, and assumed as an exposure ratio.

The PMSA is calculated by an expression, such that:

[Math 1]

$$PMSA(m^2/g) = \frac{\begin{pmatrix} \text{unit} \\ CO \\ \text{adsorption} \end{pmatrix} \times 6.02 \times 10^{23} \times \begin{pmatrix} \text{atomic} \\ \text{cross} \\ \text{section} \end{pmatrix} \times 10^{18}}{22414 \times \begin{pmatrix} \text{stoichiometrical} \\ \text{ratio} \end{pmatrix}} \quad (1)$$

where, unit $CO$ adsorption$(cm^3/g) = \frac{\text{(total adsorption)}}{\text{(sample weight)}}$ The TSA is calculated by expressions as follows. [D] is an average particle diameter of precious metal particles observed by the TEM. Letting [A] be the number of atoms of precious metal constituting a single [D], the number (n) of [D]'s contained in the catalyst is calculatable from the number [N] of precious metal atoms brought in during the preparation.

[Math 2]

$$[A] = \frac{\frac{4 \times \pi}{3} \times \left(\frac{[D]}{2}\right)^3}{\frac{4 \times \pi}{3} \times \left(\frac{\text{constituent atom radius}}{2}\right)^3} \quad (2)$$

[Math 3]

$$[n] = \frac{[N]}{[A]} \quad (3)$$

[Math 4]

$$TSA = 4 \times \pi \times \left(\frac{[D]}{2}\right)^2 \times [n] \quad (4)$$

Then, from a ratio between PMSA and TSA thus obtained, the exposure ratio was calculated.

$$\text{Exposure ratio}(\%) = (PMSA)/(TSA) \times 100 \quad (5)$$

It is noted that the calculation method described can be simplified in the form of expression (6) shown below. This expression gives an exposure ratio.

[Math 5]

$$\text{Exposure ratio}(\%) = 0.895 \times \frac{A \times B \times C \times D}{E \times F} \quad (6)$$

where
A: CO adsorption ($cm^3/g$)
B: supported precious metal cross section ($nm^2$)
C: supported precious metal density ($g/cm^3$)
D: TEM particle radius (nm)
E: stoichiometrical ratio
F: supporting density (wt %)

<Evaluation Method of Conversion Ratio>

Samples were baked in a muffle furnace, in air streams at 700° C. for 3 hours, and thereafter, using a model gas shown in Table, heated by 10° C./min from a room temperature up to 400° C., when there 50%-converted ratio temperatures (T50) of NOx were determined.

TABLE 1

| Reaction gas composition | |
|---|---|
| Components | Concentrations |
| NO | 1,000 ppm |
| CO | 0.60% |
| $H_2$ | 0.20% |
| $O_2$ | 0.60% |
| $CO_2$ | 13.90% |
| $C_3H_6$ | 1,665 ppmC |
| $H_2O$ | 10% |
| $N_2$ | rest |

<Evaluation on Stand>

For the samples, after an endurance of 30 hours at 900° C. using a Nissan make VQ3.5 L engine, measurements of their conversion ratios of NOx at 450° C. to a gas having components listed in Table 1, using a Nissan make RB2.5 L engine.

Figure 3:
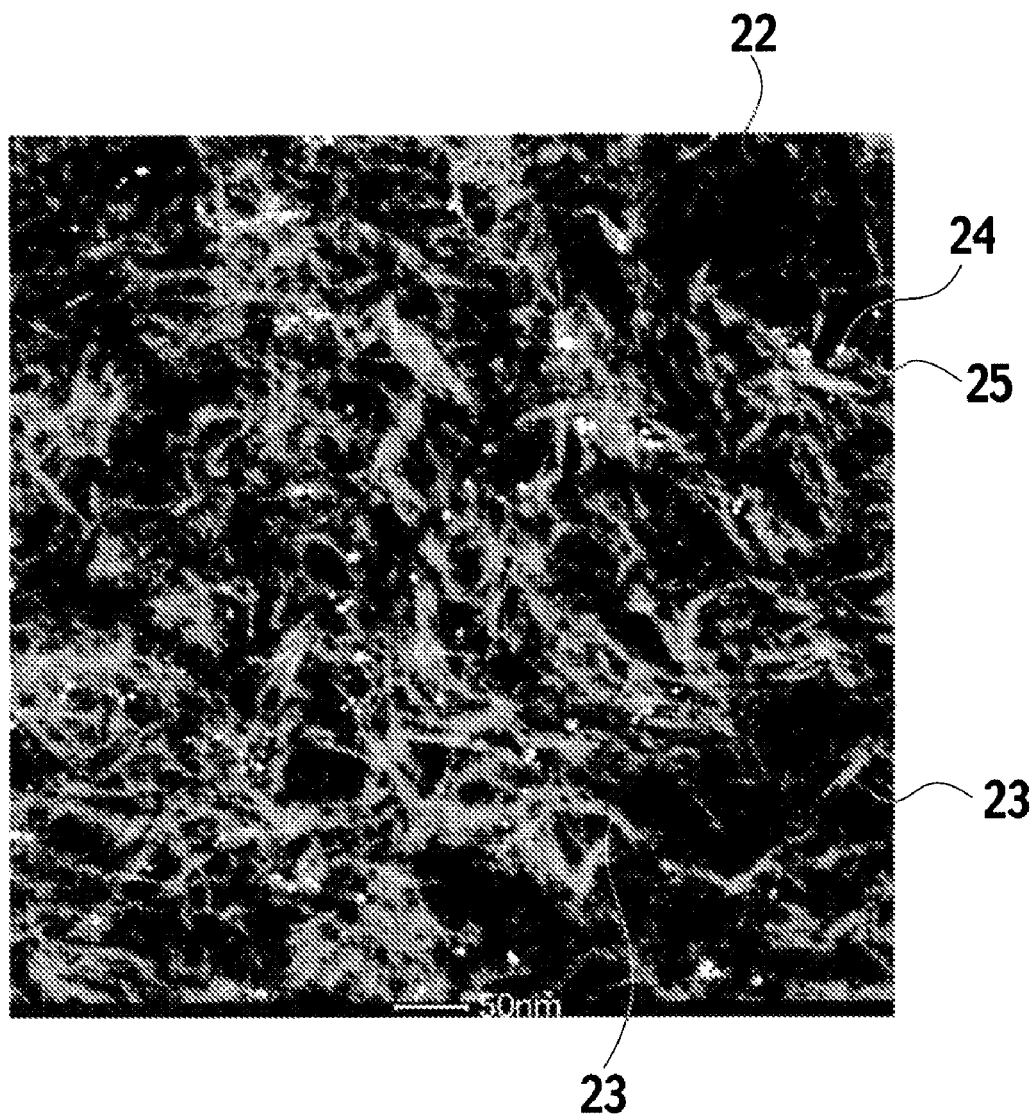
FIG. 3 is a photograph by a transmission electron microscope of a catalyst obtained in an embodiment example 4.

FIG. 3 shows a TEM photograph of a catalyst obtained in embodiment example 4, and FIG. 4 shows compositions of catalyst precursors and heat-resistant supports, and particle diameters (nm), exposure ratios (%) and T50 (° C.) of precious metals after the baking, for embodiment example 1 to embodiment example 18 and comparative example 1 to comparative example 3.

Based on results of the TEM-EDX measurements, a comparison was made between a particle diameter obtained in comparative example 1 and a particle diameter in a respective embodiment example, with the result that in any embodiment example the particle diameter of precious metal was suppressed to about ⅕-¼ of comparative example 1. Further, in any embodiment example, the T50 could be greatly reduced. As shown in FIG. 3, in the catalyst obtained in embodiment example 4, a precious metal 24 and a transition metal 25 were supported, as shown by white dots in the figure, on an outer surface of an alumina support 22 shown in black in the figure. The precious metal 24 and the transition metal 25 were included by fibrous shapes of inclusion material 23 containing an alumina component shown in the form of white fibers in FIG. 3. Such being the case, in this sample in which the inclusion material 23 was fibriform, the precious metal 24 and the transition metal 25 though being included could have a favorable contact with exhaust gases, allowing for an efficient purification of exhaust gases.

Further, as illustrated by embodiment example 4 to embodiment example 18, in cases where besides a precious metal a transition metal or a rear earth metal is supported, the catalyst could have an enhanced catalytic performance at low temperatures in comparison with samples obtained in embodiment example 1 to embodiment example 3 in which a precious metal was supported solely. Table 2 shows an excerpt of FIG. 3, and FIG. 5 shows T50's of comparative example 2, embodiment example 1, embodiment example 7, and embodiment example 15.

TABLE 2

|  | Precious metal | Transition metal | Second metal | T50 (NOx) |
| --- | --- | --- | --- | --- |
| Comparative example 2 | Pt | — | — | 261 |
| Embodiment example 1 | Pt | — | — | 248 |
| Embodiment example 7 | Pt | Mn | Ce | 226 |
| Embodiment example 15 | Pt | Mn | Ce | 215 |

Figure 5:
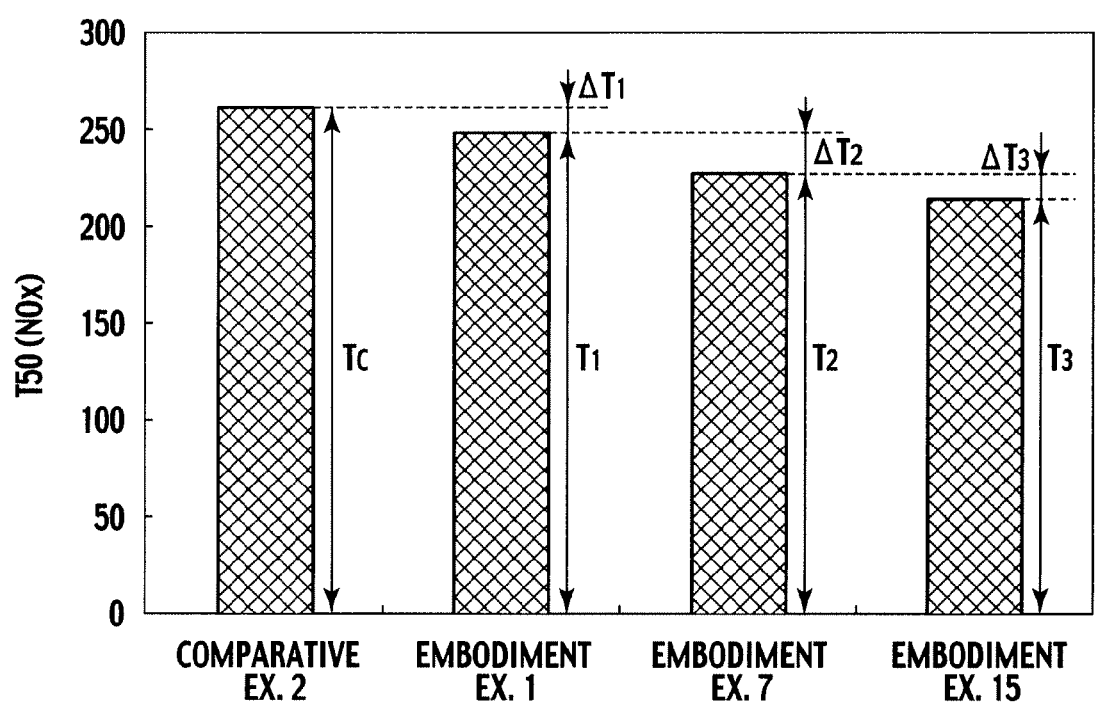
FIG. 5 is a diagram showing T50's in comparative example 2, embodiment example 1, embodiment example 7, and embodiment example 15.

In FIG. 5, the height of histogram of comparative example 2, i.e., Tc is 261° C., the height of histogram of embodiment example 1, i.e., T1 is 248° C., the height of histogram of embodiment example 7, i.e., T2 is 226° C., and the height of histogram of embodiment example 15, i.e., T3 is 215° C. For embodiment example 1 having Pt supported on a heat-resistant support, the temperature difference of T50 the embodiment example 1 had to comparative example 2, i.e., a difference $\Delta T1$ between Tc and T1 was 13° C., succeeding in a reduction of T50 by 13° C. Further, for embodiment example 7 having Mn as a transition metal and Ce as the second metal besides Pt supported on a heat-resistant support, the temperature difference of T50 the embodiment example 7 had to embodiment example 1, i.e., a difference $\Delta T2$ between T1 and T2 was 18° C., succeeding in a reduction of T50 by 18° C. Still further, for embodiment example 15 having Ce selectively disposed around Pt, the temperature difference of T50 the embodiment example 15 had to embodiment example 7, i.e., a difference $\Delta T3$ between T2 and T3 was 11° C., succeeding in a reduction of T50 by 11° C.

Next, results of the evaluation on stand are shown in Table 3, for embodiment example 15 and embodiment example 17, as well as for comparative example 1 and comparative example 2.

TABLE 3

|  | Precious metal | Transition metal | Second metal | Inclusion materials | Conversion Ratios (%) |
| --- | --- | --- | --- | --- | --- |
| Embodiment example 15 | Pt | Mn | Ce | $Al_2O_3$ | 58 |
| Embodiment example 17 | Pt | Mn | Ce | $Al_2O_3$ + La | 60 |

TABLE 3-continued

|  | Precious metal | Transition metal | Second metal | Inclusion materials | Conversion Ratios (%) |
| --- | --- | --- | --- | --- | --- |
| Comparative example 1 | Pt | — | — | — | 25 |
| Comparative example 2 | Pt | — | — | $Al_2O_3$ | 45 |

As shown in Table 3, embodiment example 15 having Ce selectively disposed around Pt had, in comparison with comparative examples 1 and 2, a higher conversion ratio of NOx at 450° C., proving provision of a catalyst with a high catalytic performance. Further, embodiment example 15 having La dispersed in inclusion material had a yet higher conversion ratio than embodiment example 15, thus providing a catalyst with an enhanced catalytic performance.

As will be seen from the foregoing results, by having a precious metal included by an inclusion material containing a component of a heat-resistant support, thereby forming a catalyst precursor, and impregnating an outer surface of the support with the catalyst precursor, it is enabled to have the precious metal supported on an outer surface of the heat-resistant support, allowing for provision of a catalyst with an excellent heat resistance. Further, in the case of presence of a transition metal or second metal, it is enabled to have a yet enhanced catalytic performance.

Although the present invention has been described into details on the basis of modes of embodiment of the invention, taking specific examples, the present invention is not restricted to the foregoing contents, and any changes and modifications may be wholly made without departing from the scope of the invention.

The whole contents of Japanese Patent Application No. 2004-361616 (filed on Dec. 14, 2004) are incorporated herein by reference.

INDUSTRIAL APPLICABILITY

The present invention allows for provision of an exhaust gas purifying catalyst with a precious metal having a maintained small particle diameter with a suppressed precious metal dispersion reduction, allowing an excellent heat resistance with a small quantity of precious metal, thus allowing for applications such as to three way catalysts for automobiles.

The invention claimed is:

1. An exhaust gas purifying catalyst, comprising:
a heat-resistant support selected from among $Al_2O_3$, $SiO_2$, $ZrO_2$ and $TiO_2$;
a first metal supported on an outer surface of the heat-resistant support and comprising a composite particle containing a precious metal selected from among Pt, Pd, and Rh and a transition metal; and
an inclusion material which contains a component selected from among $Al_2O_3$, $SiO_2$, $ZrO_2$ and $TiO_2$ and in which the first metal is included in an exposed state to an outer surface of the heat-resistant support,
wherein the first metal supported on the heat-resistant support is disposed in a pore of the inclusion material in order to form a barrier of the inclusion material around the first metal.

2. The catalyst as claimed in claim 1, wherein the transition metal is a transition metal selected from among Co, Ni, Fe, and Mn.

3. The catalyst as claimed in claim 1, further comprising a second metal selected from among Ce, La, Zr, and Ba.

4. The catalyst as claimed in claim 3, wherein the second metal contains Ce supported in a vicinal region to the first metal.

5. A method of producing an exhaust gas purifying catalyst according to claim 1, comprising:
preparing a heat-resistant support selected from among $Al_2O_3$, $SiO_2$, $ZrO_2$ and $TiO_2$;
including a first metal comprising a composite particle containing a precious metal selected from among Pt, Pd, and Rh and a transition metal in an inclusion material, the inclusion material containing a component selected from among $Al_2O_3$, $SiO_2$, $ZrO_2$ and $TiO_2$ to form a catalyst precursor; and
impregnating the outer surface of the heat-resistant support with the catalyst precursor.

6. The method of producing a catalyst as claimed in claim 5, wherein the catalyst precursor is prepared by a reversed micelle method.

7. The method of producing a catalyst as claimed in claim 5, wherein the inclusion material contains Ce.

8. An exhaust gas purifying catalyst, comprising:
a heat-resistant support selected from among $Al_2O_3$, $SiO_2$, $ZrO_2$ and $TiO_2$;
a first metal supported on an outer surface of the heat-resistant support and comprising a composite particle containing a precious metal selected from among Pt, Pd, and Rh; and
an inclusion material which contains a component selected from among $Al_2O_3$, $SiO_2$, $ZrO_2$ and $TiO_2$,
wherein the first metal supported on the heat-resistant support is disposed in a pore of the inclusion material in order to form a barrier of the inclusion material around the first metal.

9. The catalyst as claimed in claim 8, wherein the first metal comprises a composite particle which contains a transition metal in addition to the precious metal.

10. The catalyst as claimed in claim 9, wherein the transition metal is a transition metal selected from among Co, Ni, Fe, and Mn.

11. The catalyst as claimed in claim 8, further comprising a second metal selected from among Ce, La, Zr, and Ba.

12. The catalyst as claimed in claim 11, wherein the second metal contains Ce supported in a vicinal region to the first metal.

* * * * *